United States Patent
El Kolli et al.

(10) Patent No.: US 11,099,599 B2
(45) Date of Patent: Aug. 24, 2021

(54) COMMUNICATION DEVICE, CASCADED NETWORK AND INTERNAL SYNCHRONIZATION METHOD

(71) Applicant: CANON KABUSHIKI KAISHA, Tokyo (JP)

(72) Inventors: Yacine El Kolli, Rennes (FR); Romain Guignard, Rennes (FR); Arnaud Closset, Cesson-Sevigne (FR); Lionel Le Scolan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 16/164,655

(22) Filed: Oct. 18, 2018

(65) Prior Publication Data

US 2019/0138047 A1  May 9, 2019

(30) Foreign Application Priority Data

Nov. 9, 2017 (GB) .................................... 1718560

(51) Int. Cl.
*G06F 1/12* (2006.01)
*H04J 3/06* (2006.01)

(52) U.S. Cl.
CPC .............. *G06F 1/12* (2013.01); *H04J 3/0697* (2013.01); *H04J 3/0667* (2013.01)

(58) Field of Classification Search
CPC ..................................................... H04J 3/0685
See application file for complete search history.

(56) References Cited

U.S. PATENT DOCUMENTS

| 8,819,161 B1* | 8/2014 | Pannell | H04J 3/0697 |
| | | | 709/208 |
| 2002/0186716 A1* | 12/2002 | Eidson | H04J 3/0664 |
| | | | 370/503 |
| 2011/0051754 A1 | 3/2011 | Lansdowne | |
| 2012/0079310 A1 | 3/2012 | Matsusue et al. | |
| 2012/0311653 A1* | 12/2012 | Xu | H04J 3/0638 |
| | | | 725/116 |
| 2013/0121347 A1 | 5/2013 | Saito et al. | |
| 2014/0143582 A1* | 5/2014 | Kindred | H04R 25/554 |
| | | | 713/400 |

* cited by examiner

*Primary Examiner* — Paul Yen
(74) *Attorney, Agent, or Firm* — Canon U.S.A., Inc. IP Division

(57) ABSTRACT

A communication device comprising at least one communication port called reception port and another communication port called forward port, each communication port being associated with a respective clock, the communication device being further configured for computing an offset between the respective clocks associated with the reception and forward ports, and synchronizing the respective clocks based on the computed offset.

13 Claims, 10 Drawing Sheets

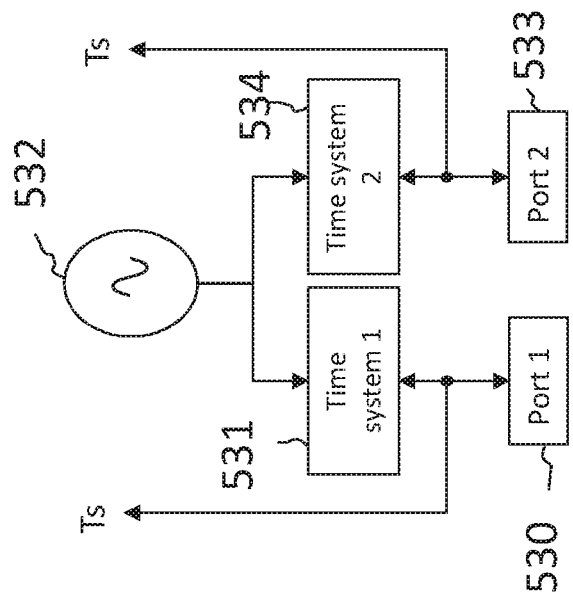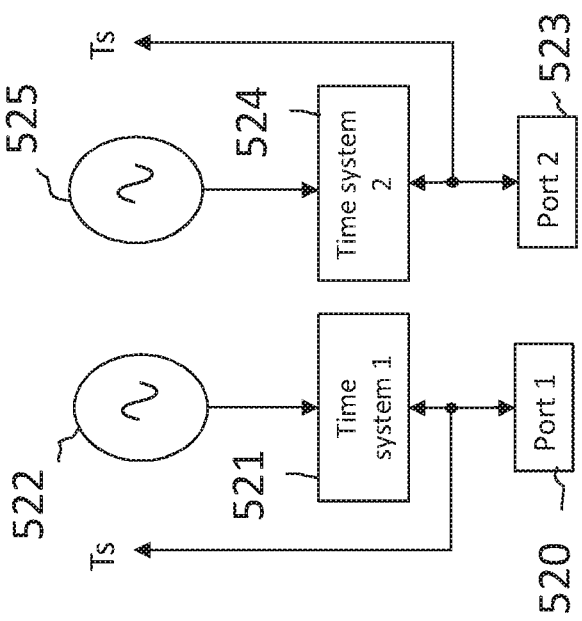
Fig. 5b

COMMUNICATION DEVICE, CASCADED NETWORK AND INTERNAL SYNCHRONIZATION METHOD

CROSS REFERENCE TO RELATED APPLICATION

This application claims the benefit under 35 U.S.C. § 119(a)-(d) of United Kingdom Patent Application No. 1718560.4, filed on Nov. 9, 2017 and entitled "Communication device, Cascaded network and internal synchronization method". The above cited patent application is incorporated herein by reference in its entirety.

FIELD OF THE INVENTION

The present invention relates generally to control devices for the control of machines, sensors and processes and in particular, control devices which can be connected to a high speed network.

More specifically, the present invention provides a communication device comprising at least two communication ports associated with independent clocks and to a method for internal synchronization of such a communication device. Also, a cascaded network comprising at least two communication devices is provided.

BACKGROUND OF THE INVENTION

Synchronizing the different elements of a network is a main challenge in control systems in which all the nodes of the systems have to maintain synchronization with a time reference.

Examples of known synchronization protocols are the "Network Time Protocol", NTP, or the IEEE 1588-2008 protocol, known as "Precision Time Protocol", PTP, and defined in document "IEEE Standard for a Precision Clock Synchronization Protocol for Networked Measurements and Control Systems" by IEEE Instrumentation and Measurements Society, Jul. 24, 2008.

The PTP standard defines how to build transparent clock switches based on a single time system shared for all ports.

This standard defines three clock types: the ordinary clock (OC), the boundary clock (BC) and the transparent clock (TC).

A grand master clock (also called "master clock") is defined to be the reference clock of the PTP network. The other clocks of the PTP network are slave clocks and must be synchronized with the grand master clock.

For instance, PTP compatible terminal network nodes implement an OC. This OC can be either the grand master or a slave. The slave OC comprises a single port device implementing a user application based on synchronized PTP time. For illustration purposes, the user application may be an audio amplifier device that uses the PTP time as a reference to synchronize the audio clock.

For instance, PTP compatible routers implement a BC. This BC can be a grand master and a slave at a same time. This is because a BC clock generally comprises a multiport device using potentially different network interface protocols. It acts as a slave device on the port connected to the grand master and as a master device on the other ports. In other words, ports are connected via a bridge, slave on one hand, master on the other hand.

For instance, PTP Ethernet switches implement a TC. The TC is a multiport stateless clock. The role of a TC is to transparently switch traffic between its ports, it does not take any role as slave or master. The TC implements a critical function for clock synchronization accuracy which is the residence time calculation. The residence time calculation allows the path delay of synchronization messages along an entire network path to be accurately known thus improving greatly the accuracy of the network time synchronization. Two types of TC exist: the "end to end" TC and the "peer to peer" TC, as defined the IEEE 1588-2008 Standard, § 8.2.5.4.4.

Slave clocks (OC, BC) and transparent clocks (TC) differ from the grand master clock in terms of frequency and absolute time value. The difference in frequency is called "frequency offset". It means that the two clocks count the time at different speed. The difference in absolute time value is called "clock offset". This means that at the same moment the two clocks have different dates and times.

A TC must be adjusted in frequency so that it will count time at the same speed as the grand master clock. This kind of clock adjustment is called "syntonization".

The slave clocks (OC, BC) must be adjusted both in frequency and offset since they must count the time at the same speed as the grand master and have the same date and time as the grand master at any moment. This clock adjustment is called "synchronization".

FIG. 1 illustrates a typical architecture of a four port TC Ethernet switch 100. The Ethernet frame enters and leaves the switch 100 to and from the ports 1 to 4 (101, 102, 103, 104).

The layer 2 (L2) bridge 105 is configured to control the routing of each Ethernet frame between the four ports. The routing decision of the Ethernet frames containing PTP messages is typically decided according to the 1588 standard while the routing of all other Ethernet frames is decided according to an Ethernet bridging protocol such as described in the 802.1 D or 802.1 Q standards.

According to the 1588 standard, while routing specific PTP messages ("Sync" and "Delay_req" messages), the L2 bridge 105 computes the time spent by these messages between the reception and the forward. This time is the aforementioned residence time. The calculated residence time is cumulated in a specific field of the message itself ("Sync" or "Delay_req" message) or in a subsequent "Follow-up" or "Delay_resp" message. The residence time is computed as the difference between the egress and the ingress timestamps generated when the corresponding Ethernet frame enters and leaves the port.

The timestamps are provided by a time system 106 which can be for instance a free running time counter. The obtained residence time accuracy is known to be improved with a syntonized (Frequency locked) time counter 111 as shown in FIG. 1. The frequency offset between the TC oscillator 107 and the grand master oscillator is computed by a module of rate estimation 108. Next a frequency correction 109 is applied typically by changing the increment of the time counter 111 at each oscillator edge using a TIMEINC register module 110.

FIG. 2 illustrates an example of daisy chain topology with co-located ordinary/transparent clocks.

In this example, a grand master (GM) 200 embeds an ordinary clock-0 which will be used as a reference clock by the whole system. There are three slave (S) nodes 210, 220 and 230 which each comprise one ordinary clock (respectively 211, 221 and 231) to synchronize with the grand master clock and one transparent clock P2P TC (respectively 212, 222, 232) in charge of computing the residence time and inserting it in the forwarded synchronization messages ("sync" message from the GM and "delay_req" coming from the different slave nodes).

The different nodes are linked together with links 201, 202, 203. The slave 211 is directly synchronized using the message from the GM 200. The slave 221 is synchronized using the message from the GM 200 updated by the P2P TC 212 (insertion of the residence time in the "Correction" field) and the slave 231 is synchronized using the message from the GM 200 updated by the TCs 212 and 222.

Generally speaking, PTP clock function co-location (or combination) is particularly advantageous in large scale cascaded capturing or rendering systems. This is because even if such systems combine a large number of slave devices over a large topology, the network topology itself can be built with simple routing/switching devices. For example it takes only two port devices to build a daisy chain topology.

It is thus advantageous to combine in a single device the OC slave function and the low scale TC switching function as opposed to using plain TC Ethernet switches which are often provided with a large number of ports (from 8 to 48 or more).

One can lower the costs of designing a device that achieves the function combination by using COTS (Commercial off the shelf) Ethernet LAN boards, either multi-ports LAN boards or using multiple LAN boards.

FIG. 3 illustrates a typical architecture of COTS dual port LAN board 300. The architecture description has been focused on the time system and the remaining functions have been simplified. The main difference with the TC Ethernet switch shown in FIG. 2 is the duplication of the time system function 301 and 302. Typically a COTS LAN board implements independent time systems for each port. Moreover, some COTS LAN board provides independent oscillators 303 and 304 for each time system.

Compared to the TC Ethernet switch shown in FIG. 1, the time system here offers a second adjustment interface "offset correction" 305 allowing the clock offset to be corrected directly. This second adjustment is mandatory for OC clock implementation since it requires clock synchronization (as opposed to clock syntonization for the TC). Each offset correction block 305 comprises a time counter 306. The COTS also comprises two ports 307 and 308.

The functions of rate estimation, L2 bridge or residence time are not always provided by default and are subject to software implementation on the host CPU (not shown).

As specified in the PTP standard, a TC clock calculates the residence time of some PTP messages. To do so, a TC clock generates a timestamp upon message arrival at one port ("TSrx"), and another timestamp when this message is forwarded onto a second port ("TStx"). Next, the TC clock computes the packet residence time as the difference between these two timestamps (TStx−TSrx). This residence time is then inserted in a dedicated field either in the forwarded packet or in a subsequent follow-up packet. The computed residence time value is accurate because both timestamps are generated from a same clock counter reference as shown in FIG. 1.

However, if the timestamps are generated from independent clock counters as shown in FIG. 3, the resulting computed residence time is inaccurate. This is because of inconsistencies such as jitter or errors between timestamps that are typically caused by rate changes of the local clock. Also, syntonized peer-to-peer TC may delay clock adjustment after packet forwarding while syntonized end-to-end TC may not be able to delay clock adjustment because of the unpredictable arrival time of delay request messages. Co-located OC/TC cannot delay clock adjustment without jeopardizing the user application accuracy.

Therefore, the residence time calculation is biased since it is computed based on the difference between the values of two unrelated time counters. This is an important issue in cascaded networks since errors accumulate from node to node.

As the PTP standard specifically relies on the fact that the timestamps are generated from a single time source, it does not provide any solution for this situation (timestamps generated based on unrelated clock counters).

There is thus a need for an effective architecture that maintains a high level of clock accuracy across a cascaded network allowing residence time computation improvement.

SUMMARY OF THE INVENTION

The present invention has been devised to address one or more of the foregoing concerns.

According to a first aspect of the invention, there is provided a communication device comprising at least one communication port called reception port and another communication port called forward port, each communication port being associated with a respective clock, the communication device being further configured for:

computing an offset between the respective clocks associated with the reception and forward ports; and synchronizing the respective clocks based on the computed offset.

Therefore, the invention makes it possible to achieve a high level of clock accuracy and thus the residence time calculation is improved.

This is thanks to the consideration of the internal clock offset when synchronizing the clocks.

Thus, even in the case of unrelated clock counters, the residence time calculation may be performed with a good reliability and better synchronization accuracy is achieved.

Optional features of the invention are further defined in the dependent appended claims.

According to embodiments, one of the communication ports is set as the master port.

According to embodiments, synchronizing the respective clocks is based on a Pulse Per Second (PPS) signal synchronized with the clock of the master port, the PPS signal being received by all the other communication ports.

According to embodiments, the respective clocks are cadenced by the same oscillator and the communication device is further configured for performing the following steps at start-up:

adjusting the clock associated with the master port with the Grand Master clock of a system comprising the communication device;

applying a same adjustment to all the other clocks associated with the other communication ports.

According to embodiments, the respective clocks are each cadenced by a respective independent oscillator and the communication device is further configured for applying a process between the master port and the other communication ports during runtime of the communication device for maintaining the synchronization of the clocks associated with the communication ports, the process taking into account the computed offset.

According to embodiments, the process comprises:

computing a clock adjustment to apply to the respective clocks based on the computed offset;

adjusting the respective clocks with the computed clock adjustment.

According to embodiments, this process comprises:

upon PPS interrupt, computing a clock adjustment to apply to the respective clocks based on a timestamp associated with the PPS interrupt;

adjusting the respective clocks with the computed clock adjustment.

According to embodiments, the communication device is further configured for launching a process running a PTP stack for synchronizing clock associated with the master port with the Grand Master clock of a system comprising the communication device.

According to embodiments, the communication device is further configured for computing a residence time as the amount of time elapsed between reception of a message at the reception port and forward of this message at the forward port.

According to a second aspect of the invention, there is provided a method for internal synchronization of a communication device comprising at least two communication ports, each communication port being associated with a respective clock, the method comprising the following steps:

computing an offset existing between the respective clocks associated with the communication ports; and synchronizing the respective clocks based on the computed offset According to a third aspect of the invention, there is provided a cascaded network comprising at least two communication devices as aforementioned.

The second and third aspects of the present invention have features and advantages similar to the first above-mentioned aspect.

Since the present invention may be implemented in software, the present invention may be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device or the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 5b shows a system with a single oscillator and a system with one oscillator for each port;

DETAILED DESCRIPTION OF EMBODIMENTS OF THE INVENTION

In the following description, the terms "time counter alignment" and "adjustment process" refer to the synchronization of two counters at initialization of the system, notably when these counters are cadenced by the same oscillator.

Also, in the following description, the terms "discipline process" refer to the maintaining of the synchronization of two counters during runtime of the system, notably when these counters are cadenced by two independent oscillators.

In the following description, the terms "time system" refer to the clock associated with a port. It comprises means for adjusting it and updating it.

According to embodiments, the PTP stack, which calculates both rate ratio and phase offset of a time system to which is it attached, is attached to one port called the master port, which is the only port connected to the Grand Master. The time system of the master port is synchronized with the Grand Master time. The time systems of the other ports are synchronized to the master port time system both in frequency and offset thanks to:

an adjustment process performed at the system start-up, that allows the master port clock adjustments (to fit the Grand Master time) to be applied to all the other ports and the initial offset between ports to be reset, and a discipline process performed continuously during runtime based on an estimation of the clock offset between the master port and the other ports.

According to embodiments (hardware-assisted), the adjustment process is based on a Pulse Per Second (PPS) signal synchronized with the clock of the master port and received by all the other ports.

The PPS signal is a periodic signal generated synchronously to the time counter 306 at each round second as defined in "*Hardware Assisted COTS IEEE* 1588 *Solution for x86 Linux and its Performance Evaluation*" by Bálint Ferencz and Tamás Kovácsházy, for instance.

In general terms, the PPS signal can be defined as an output signal of a COTS LAN board (The master port) or as an input signal to a COTS LAN board (Slave port), A COTS LAN board will generate an interrupt to the CPU at each rising edge of the input PPS signal along with an associated timestamp that indicates the precise time of occurrence of the rising edge.

In this way, the clock system reset is made independent from the hardware reset. Also, the clock offset estimation and thus the residence time calculation are more accurate and the internal clock synchronization is achieved with less error.

Figure 4:
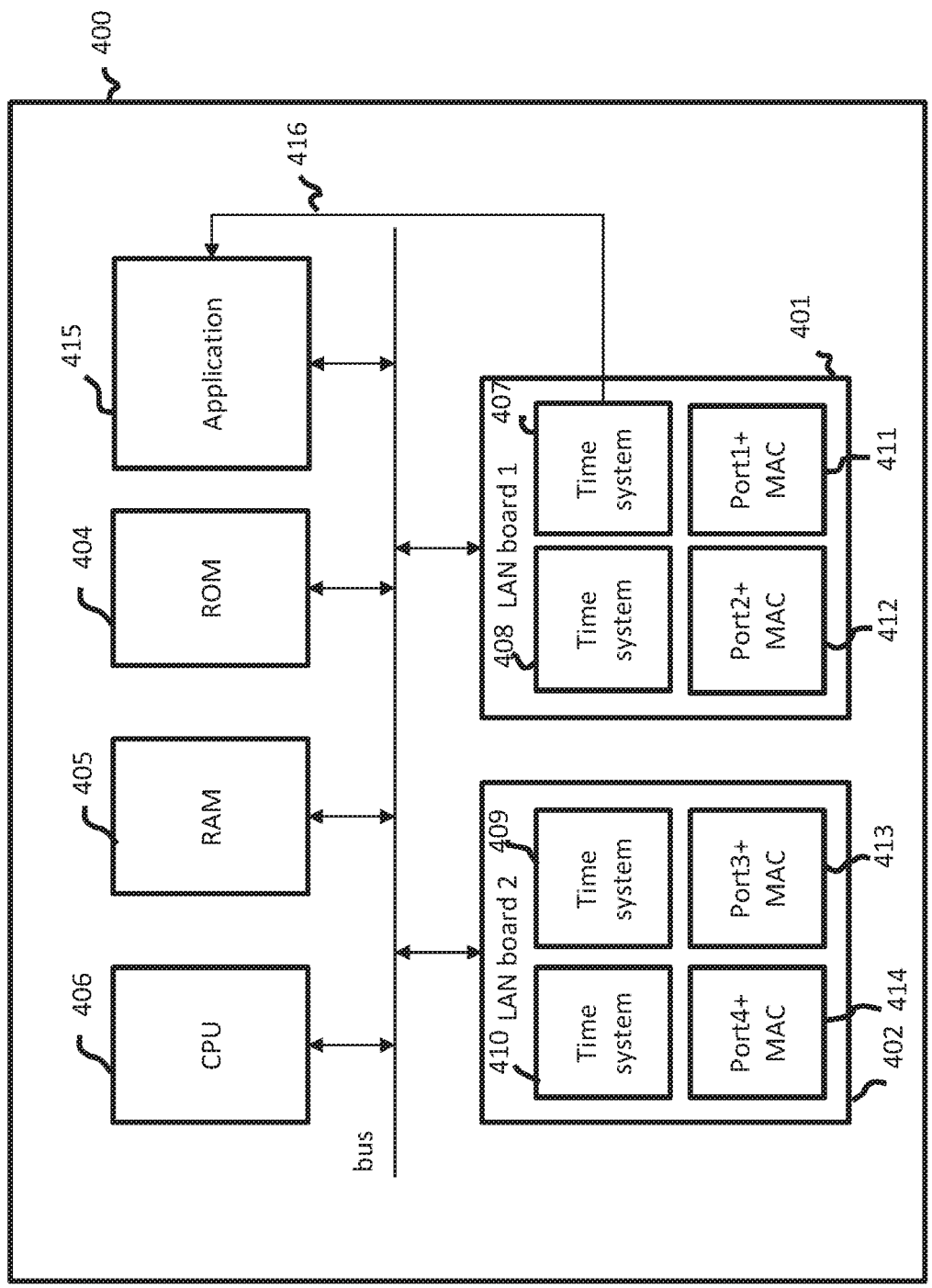
FIG. 4 illustrates an exemplary architecture of a combined OC/TC device according to embodiments.

FIG. 4 illustrates an exemplary architecture of a combined OC/TC device (node 400) according to embodiments.

Figure 1:
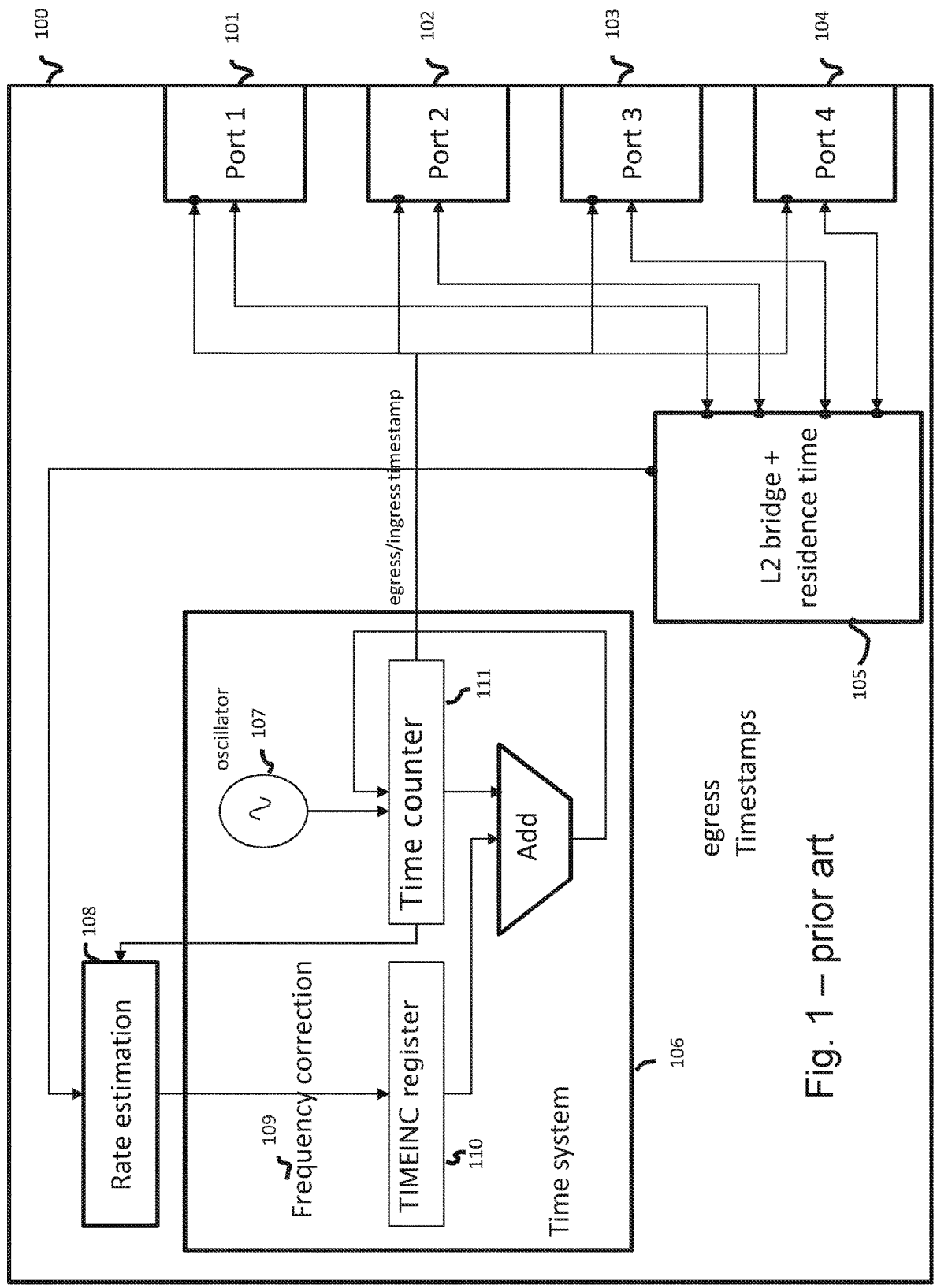
FIG. 1 illustrates a typical architecture of a four port TC Ethernet switch.
Figure 2:
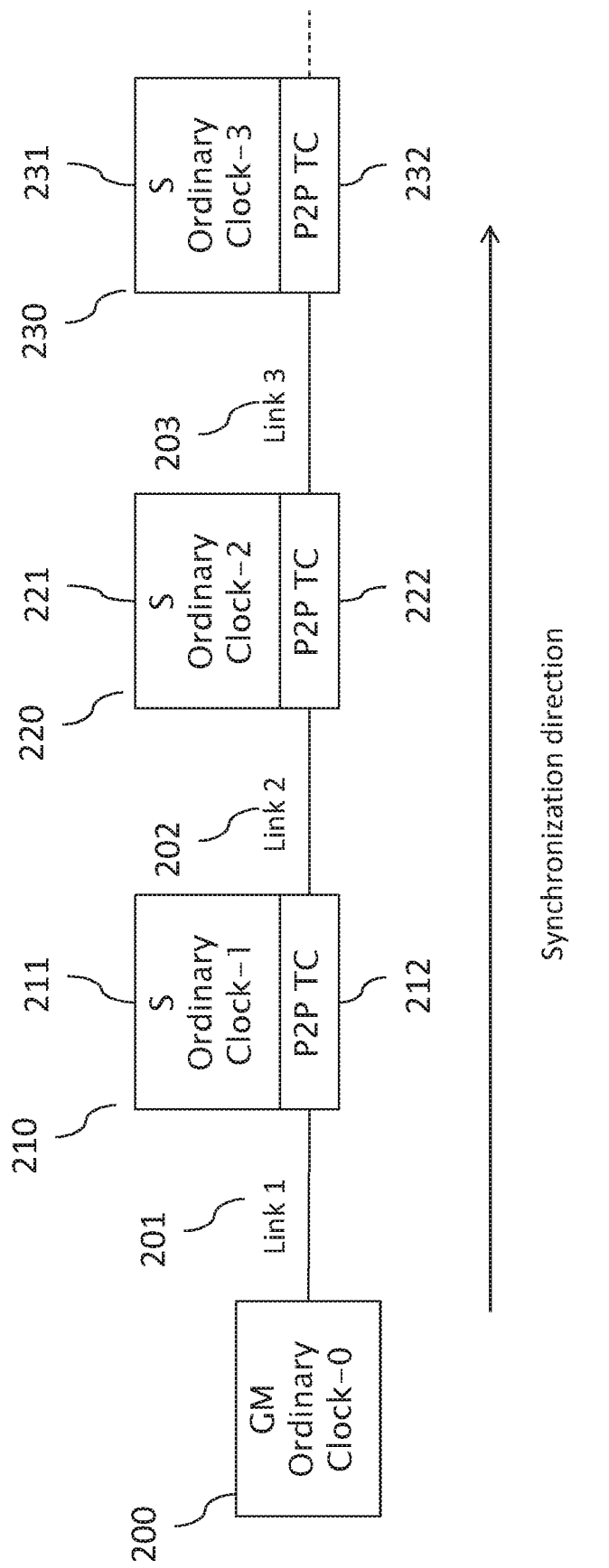
FIG. 2 illustrates an example of daisy chain topology with co-located ordinary/transparent clocks.
Figure 3:
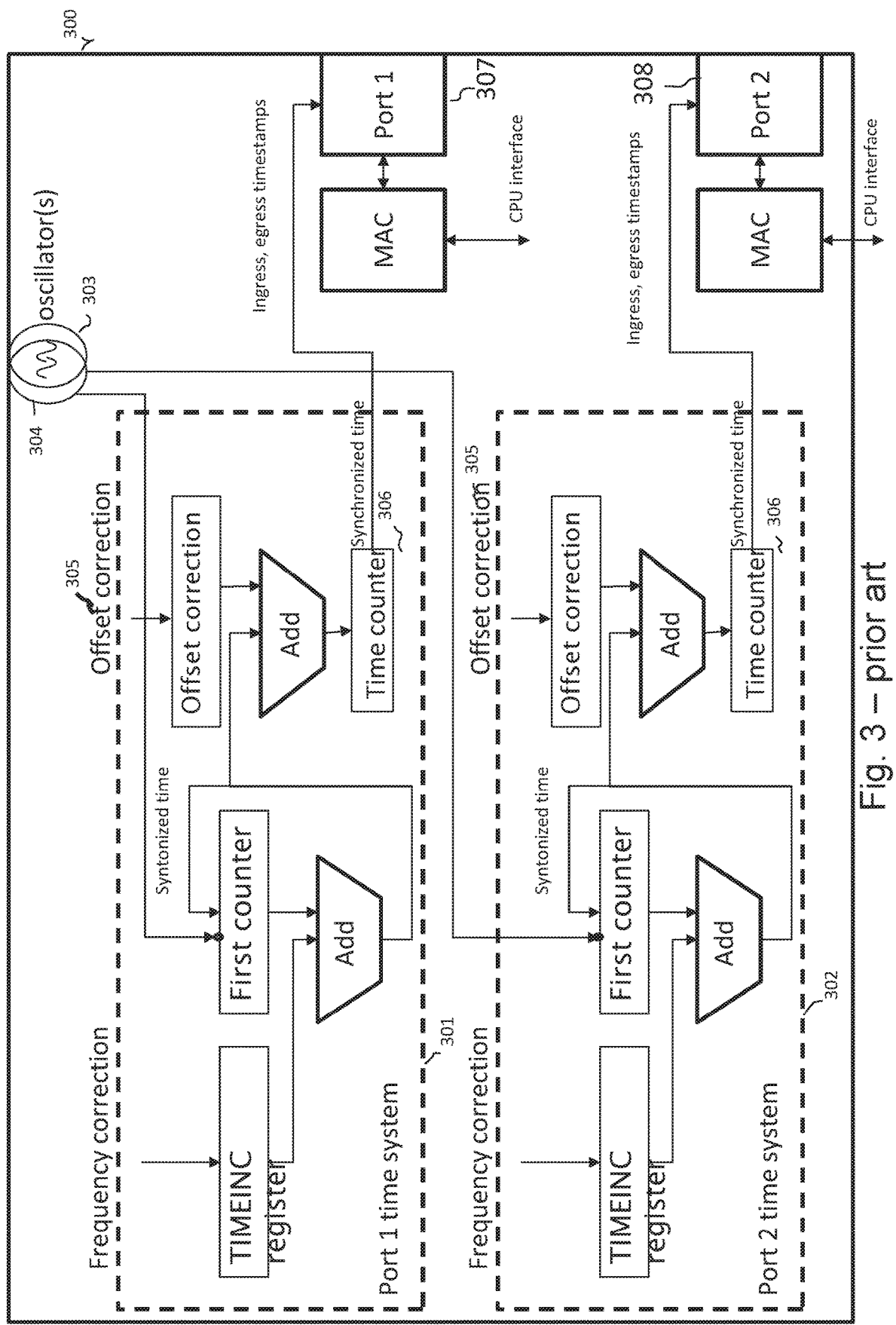
FIG. 3 illustrates a typical architecture of a COTS dual port LAN board.

In this example, the node 400 comprises two dual port LAN boards 401 and 402. An example of architecture for such LAN board is described above with reference to FIG. 3. The LAN board 401 and 402 can be any COTS LAN board with hardware timestamping support such as the Intel (Intel is a trademark) Ethernet Server Bypass Adapter X540-T2 which implements independent oscillators for each port or the Intel (Intel is a trademark) "Ethernet Converged Network Adapter X550-T2" which implements a common oscillator for all ports.

The L2 bridge and the PTP stack functions performing the rate ratio and phase offset computation are stored in the ROM memory 404, copied at boot to the RAM memory 405 and executed by the CPU 406.

In this example the node 400 has four network ports (411, 412, 413, 414) associated with four time systems (407, 408, 409, 410). The network ports are implemented on two different LAN boards. In the following description, it is assumed that the master port is Port 1 (411).

The PTP stack is configured to obtain transmission and reception timestamps from the time systems attached to the network ports. It calculates the rate ratio of the master port clock 407 compared to the Grand Master (OC) and the phase offset of the master port clock 407 compared to the Grand Master (OC and OC/TC). It also adjusts the master port clock 407 both in frequency and offset.

The residence time function also runs on the CPU 406. It is described in further detail with reference to FIG. 9.

The Application 415 can be either an acquisition application or a rendering application. In this example, the application 415 is synchronized thanks to a Pulse Per Second PPS signal 416 issued from the time system 407 of one of the LAN boards.

Figure 5A:
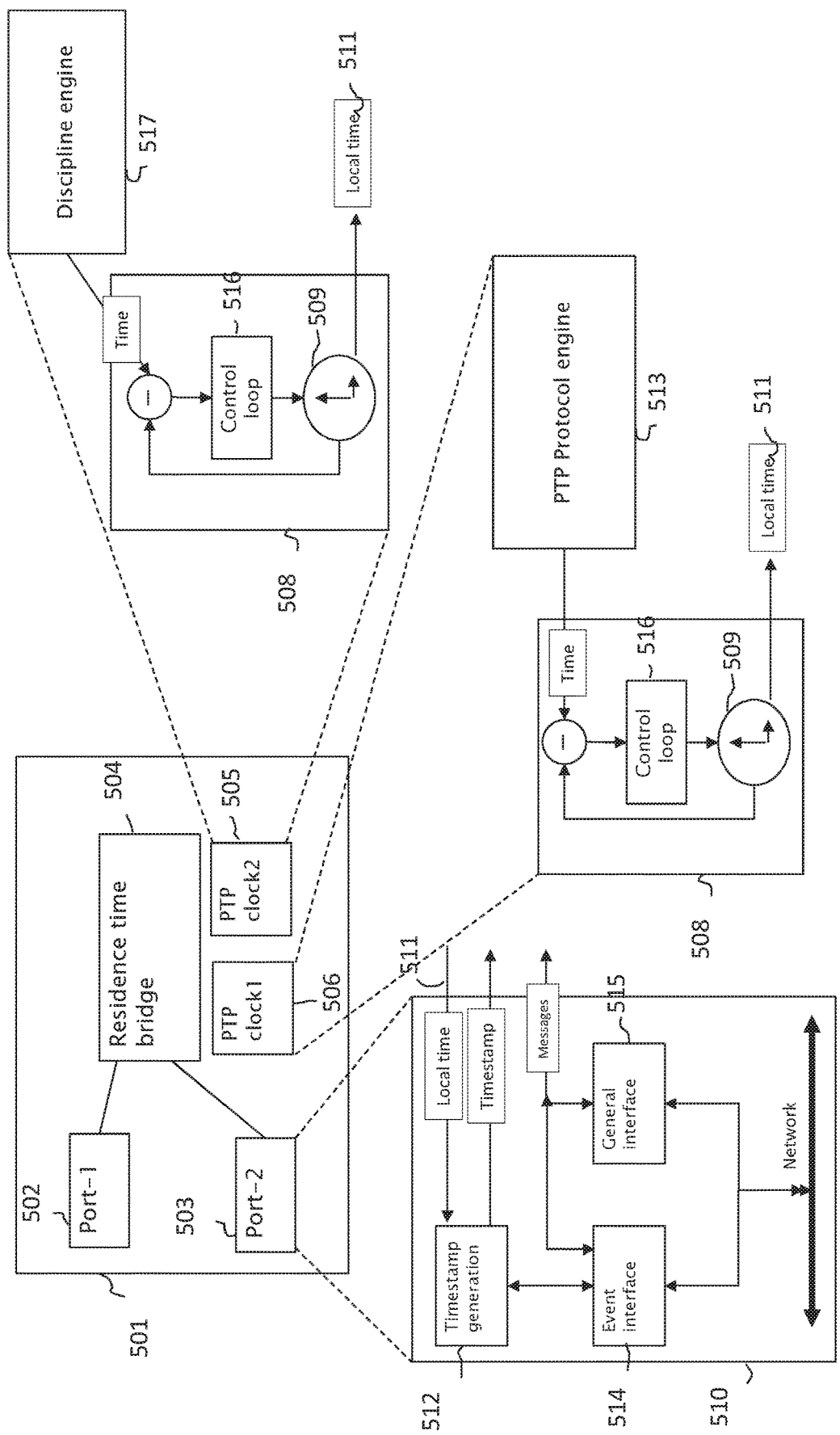
FIG. 5a illustrates a two-port co-located OC/TC slave node according to embodiments.

FIG. 5a is a functional diagram that illustrates a two-port co-located OC/TC slave node (including a LAN board) according to embodiments.

In this example, the node 501 has two ports 502 (Port-1), 503 (Port-2) each having its own PTP clock 506 (PTP clock 1), 505 (PTP clock 2). The node also comprises a residence time bridge 504.

The port 503 is detailed in 510. It receives the local time 511 from the PTP clock 1. The port 503 comprises a timestamp generation unit 512, an event interface 514 and a general interface 505 both connected to the network. The port 502 has a similar architecture.

Hence, PTP messages entering ports 1 or 2 are directed to the event interface 514 or the general interface 515 of the port. The event messages are provided a timestamp (generated in 512) when entering and leaving the port.

The PTP clock 506 is detailed in 508. It is composed of a time system 509 implementing an adjustable time counter whose role is to provide a synchronized time based on which timestamps are generated (in 512). Clock adjustment calculation is also based on the synchronized time and a control loop 516. The clock adjustments of the first clock 506 are determined by a PTP protocol engine 513 according a PTP OC slave procedure.

The PTP clock 505 has a similar architecture but the clock adjustments are determined by a discipline engine 517 (instead of the PTP protocol engine 513).

In practice, when entering the first PTP port, the messages are first provided to the PTP protocol engine 513. The PTP protocol engine handles these messages according to the standard OC slave behavior. This results in the first clock 506 adjustment through the control loop 516. The set formed by the PTP protocol engine 513 and the associated control loop 516 is implemented as a software process running on the CPU 506.

Figure 6:
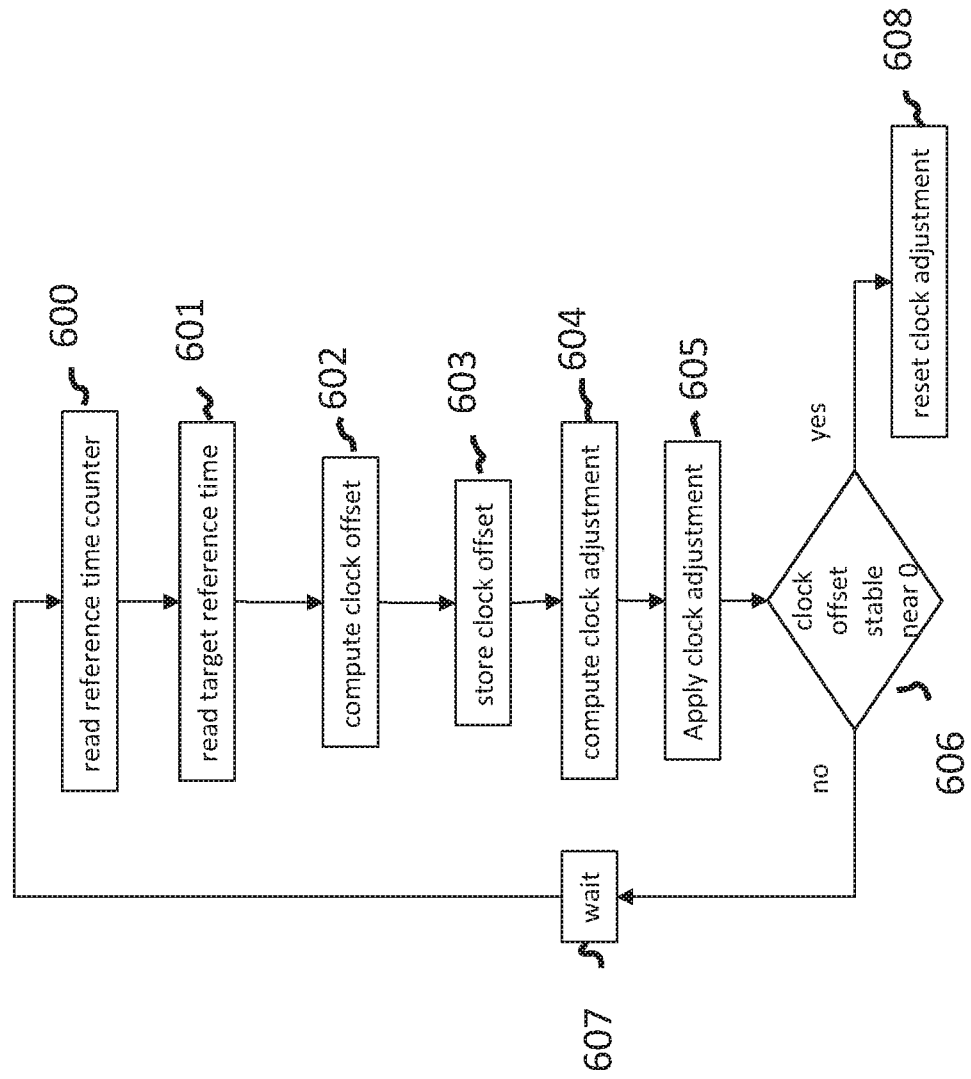
FIG. 6 illustrates steps of a time counter alignment process performed at the system start-up according to first embodiments (software-only)
Figure 7:
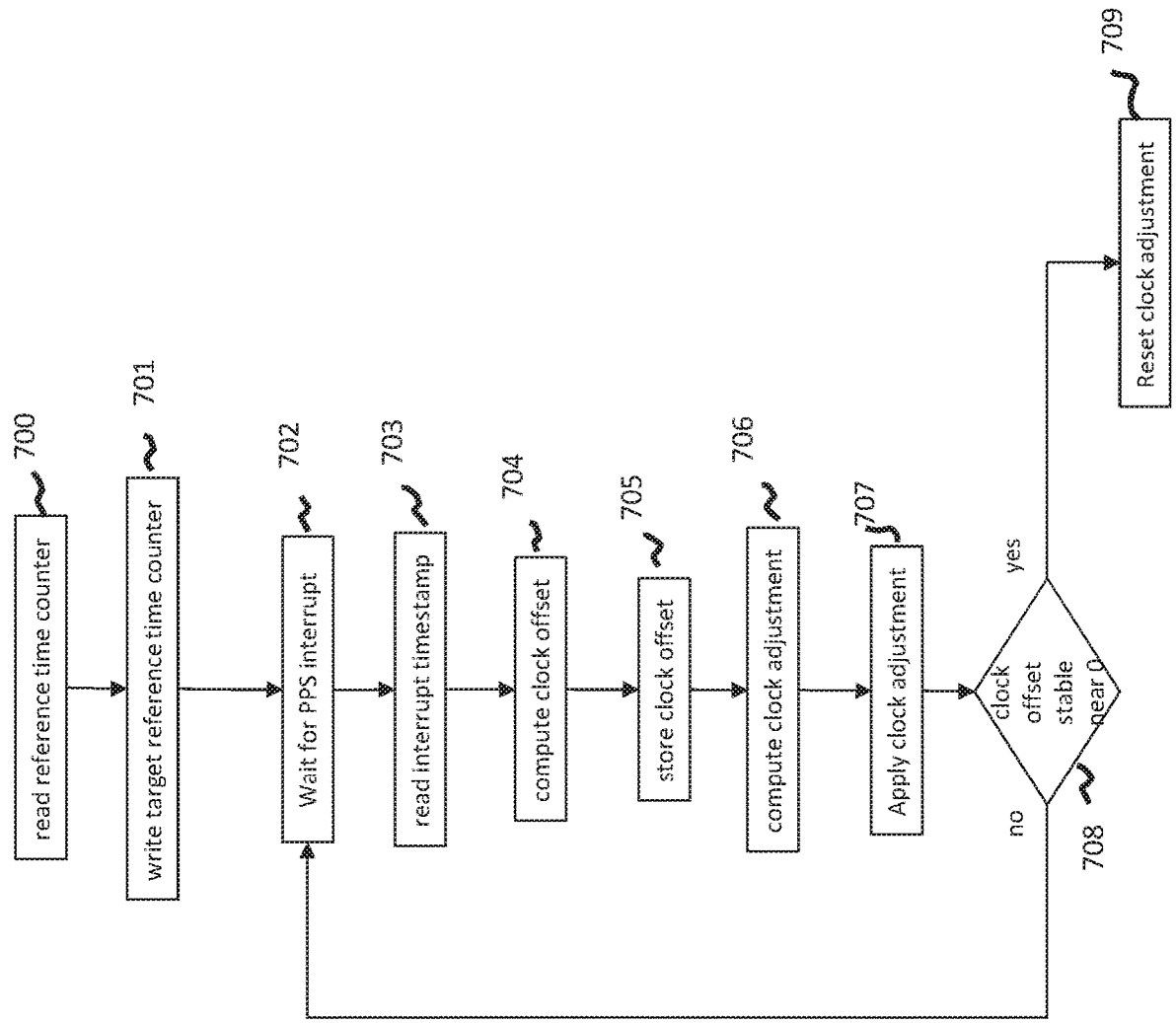
FIG. 7 illustrates steps of a time counter alignment process performed at the system start-up according to second embodiments (PPS assisted)

Once the PTP engine processing is done, the PTP messages are forwarded to the second port by the residence time bridge 504 while the other messages are forwarded without additional processing. The discipline process performed by the discipline engine 517 and associated control loop 507 may be implemented as a software process (as depicted in FIG. 6) running on the CPU 506 or may be a mixed hardware/software (as depicted in FIG. 7).

Event messages are handled by the residence time bridge 504 where the time spent by the event packet from reception to transmission is calculated as the difference between the incoming timestamp and the outgoing timestamp. According to embodiments, this calculation is enhanced by taking into account the offset between the two clocks 506 and 505.

When entering the second port 503, the PTP messages are directly provided to the residence time bridge 504 for processing.

The residence time bridge may be implemented as a software process running on the CPU 506 and is described with reference to FIG. 9.

FIG. 5b shows a LAN board with a single oscillator and a LAN board with one independent oscillator for each port. The present invention applies to both cases.

At the left side of the figure, the first port 520 is associated with a first time system 521 cadenced by a first oscillator 522. The second port 523 is associated with a second time system 524 which is cadenced by a second oscillator 524 which is independent from the first oscillator 522.

Thus, in this case, each time system follows the cadence of a different independent oscillator. Hence the time counters (not shown) of each time system will have a different frequency bias compared to the Grand Master clock.

In practice, the first time system is synchronized using a PTP process. The other time system is synchronized with it by a discipline process. In the case of more than two time systems (or several LAN boards), a discipline process should be performed for each time system having its own independent oscillator.

The discipline process takes as input a reference time from the master port and a reference from the targeted time system. These references can be either the time counter (software-only procedure, FIG. 6) or a PPS output (PPS-assisted procedure, FIG. 7). After processing the difference between the two references, the discipline process issues clock adjustment orders to the targeted time system.

At the right side of the figure, the first port 530 is associated with a first time system 531 cadenced by an oscillator 532. The second port 533 is associated with a second time system 534 which is cadenced by the same oscillator 532.

In this case (single oscillator) the oscillator 532 is used to provide the same cadence to the two different time systems 531 and 534. Hence the time counters (not shown) of each time system will have the same frequency bias compared to the Grand Master clock. The discipline process for regulating the clock of the second time system 534 is thus simplified compared to the second time system 524.

In practice, an initial step of aligning the time counters is performed. It is described with reference to FIG. 6. Next, the adjustment of the first time system is directly handled by the PTP process and the other time system receives the same clock adjustment as the first port as described with reference to FIG. 7. Hence, the clock adjustment orders generated by the PTP process result in perfect alignment of all the time systems during the whole system life.

In the case of more than two time systems (or several LAN boards), a discipline process is necessary for each other board. The discipline process takes as input a reference from the master port of the first board and a reference from the first port of a second board. These references can be either the time counter (software-only procedure, FIG. 6) or a PPS output (PPS-assisted procedure, FIG. 7). After processing the difference between the two references, the discipline process issues clock adjustment orders that are duplicated to all the time systems of the second board.

FIG. 6 illustrates steps of a time counter alignment process performed at the system start-up according to first embodiments. In these first embodiments, the time counter alignment process is of software-only type.

Generally speaking, this process aligns the time counter of a target time system (slave) with the time counter of a reference time system (master). This is performed for all the time systems (pair by pair) from the master time system to the last time system. It is executed by the CPU.

At first step 600, the time counter of the reference time system is read.

At step 601, the time counter of the target time system is read.

At step 602, the frequency offset and the phase offset between the two time systems are computed.

In practice, the frequency offset computation is started after the second loop of the process. The computation preferably takes into account the time elapsed between the two sequential readings of the time counters.

At step 603, the computed clock offset (i.e. frequency and phase offsets) is stored in RAM memory as the initial clock offset so that it can be accessed later, when the residence time of a message is computed (as described with reference to FIG. 9).

At step 604, a clock adjustment is calculated to compensate for the clock difference computed at the previous step.

At step 605, the calculated clock adjustment is applied to the target time system. In practice, the frequency can be adjusted for example by modifying the "time_inc" register and the time offset can be adjusted by modifying the "offset_correction" register.

When the calculated clock offset is stable near 0 (test 606), meaning that the time counters are aligned, the procedure can be stopped. Otherwise, the process loops at step 607.

In practice, the calculated clock offset is considered as being stable for example if for 5 consecutive calculations (loops 607) it is always near 0, or if it is low and has very little variation.

When the procedure is finished, the process goes to a last step 608 where the clock adjustment order is reset at the target time system.

FIG. 7 illustrates steps of a time counter alignment process performed at the system start-up according to second embodiments. In these second embodiments, the time counter alignment process is PPS-assisted.

As previously mentioned for the first embodiments (software-only), this process aims at aligning the time counter of a target time system with the time counter of a reference time system.

A PPS signal is generated by the reference time system. This PPS signal is input in the target time system. At each signal level change of the PPS signal, i.e. at each rising or falling edge of the PPS signal (electrical signal change between low level and high level), a timestamp is generated at the target time system. This process is executed by the CPU.

In the first two steps 700 and 701, the reference system time counter is read and its value is used to initialize the target system time counter. The purpose of this step is to make sure that the time counters of the two time systems run within the same second.

At step 702, there is awaited an interrupt of the target time system indicating that a timestamp has been generated following a PPS input signal edge change (i.e. at each rising or falling edge of the PPS signal).

At step 703, the PPS timestamp is read.

At step 704, the frequency offset and the phase offset between the two time systems are computed.

In practice the phase offset between the two time systems is equal to the sub-second part of the timestamp because the 1 Hz PPS signal is generated by the reference system on a one second frontier (when the "second" part of the timestamp is changed).

At step 705, the computed clock offset (i.e. frequency and phase offsets) is stored in the RAM memory as the initial clock offset so that it can be accessed later when the residence time of a message is computed (as described with reference to FIG. 9).

At step 706, a clock adjustment is calculated to compensate for the clock offset computed at the previous step.

At step 707, the clock adjustment is applied to the target time system. In practice, the frequency can be adjusted for example by modifying the "time_inc" register and the time offset can be adjusted by modifying the "offset_correction" register.

When the calculated clock offset is stable near 0 (test 706), meaning that the time counters are aligned, the procedure can be stopped. Otherwise, the process loops at step 702.

In practice, the calculated clock offset is considered as being stable for example if for 5 consecutive calculations (i.e. 5 loops) it is always near 0, or if it is low and has very little variation.

When the procedure is finished, the process goes to a last step 709 where the clock adjustment order is reset at the target time system.

Figure 8:
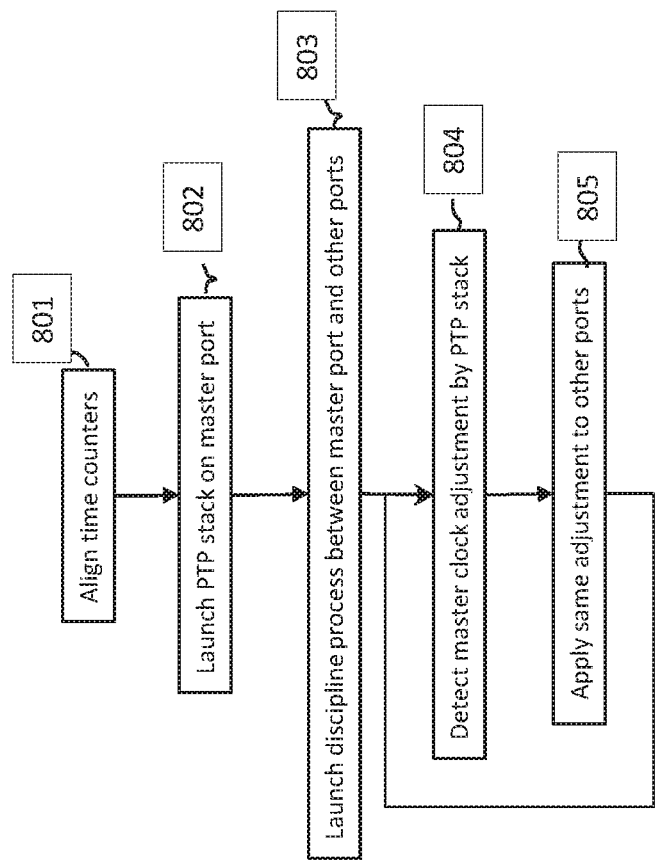
FIG. 8 illustrates steps performed at the system start-up for maintaining the internal synchronization of clocks according to embodiments.

FIG. 8 illustrates steps performed from the system start-up and during runtime for maintaining the internal synchronization of clocks according to embodiments. As will be described below, each time the clock associated with the master port is adjusted to the Grand Master clock, the same adjustment is applied to all the other clocks associated with the other communication ports.

At step 801, the time alignment of all the time counters (of the master port and the other ports pair by pair) is performed. Examples of such time alignment process are described with reference to FIGS. 6 (software-only) and 7 (PPS-assisted).

This first step may be skipped for LAN boards implementing independent oscillators for each time system.

At step 802, a process running an OC slave PTP stack is launched. It aims at synchronizing the master port with the PTP Grand Master reference time.

At step 803, the remaining time systems of the node will be synchronized with the master port. This internal process is called "discipline process". It is similar to the time alignment process described with reference to FIGS. 6 (software-only) and 7 (PPS-assisted) but without exit condition (steps 606 and 708), hence this process is performed continuously during runtime.

Thus, the discipline process allows adjustment to a target clock with reference to a reference clock to be made by mean of an intermediate synchronization signal representing the reference clock. In the software method the intermediate reference signal is the time counter value and in the PPS assisted method the intermediate signal is the PPS signal.

In practice, the first time systems of all LAN boards are synchronized with the master time system. Next, the other time systems of the LAN boards will be synchronized with the first time system of their LAN board.

If the first LAN board implements a single oscillator for all time systems, when, at step 804, it is detected that there is a master clock adjustment by the PTP stack (step 802), the clock adjustment (frequency and offset adjustments) is applied to all the time systems at step 805 and then the process loops back to step 804 so that each time there is a master clock adjustment by the PTP stack, the other clocks are also adjusted.

Figure 9:
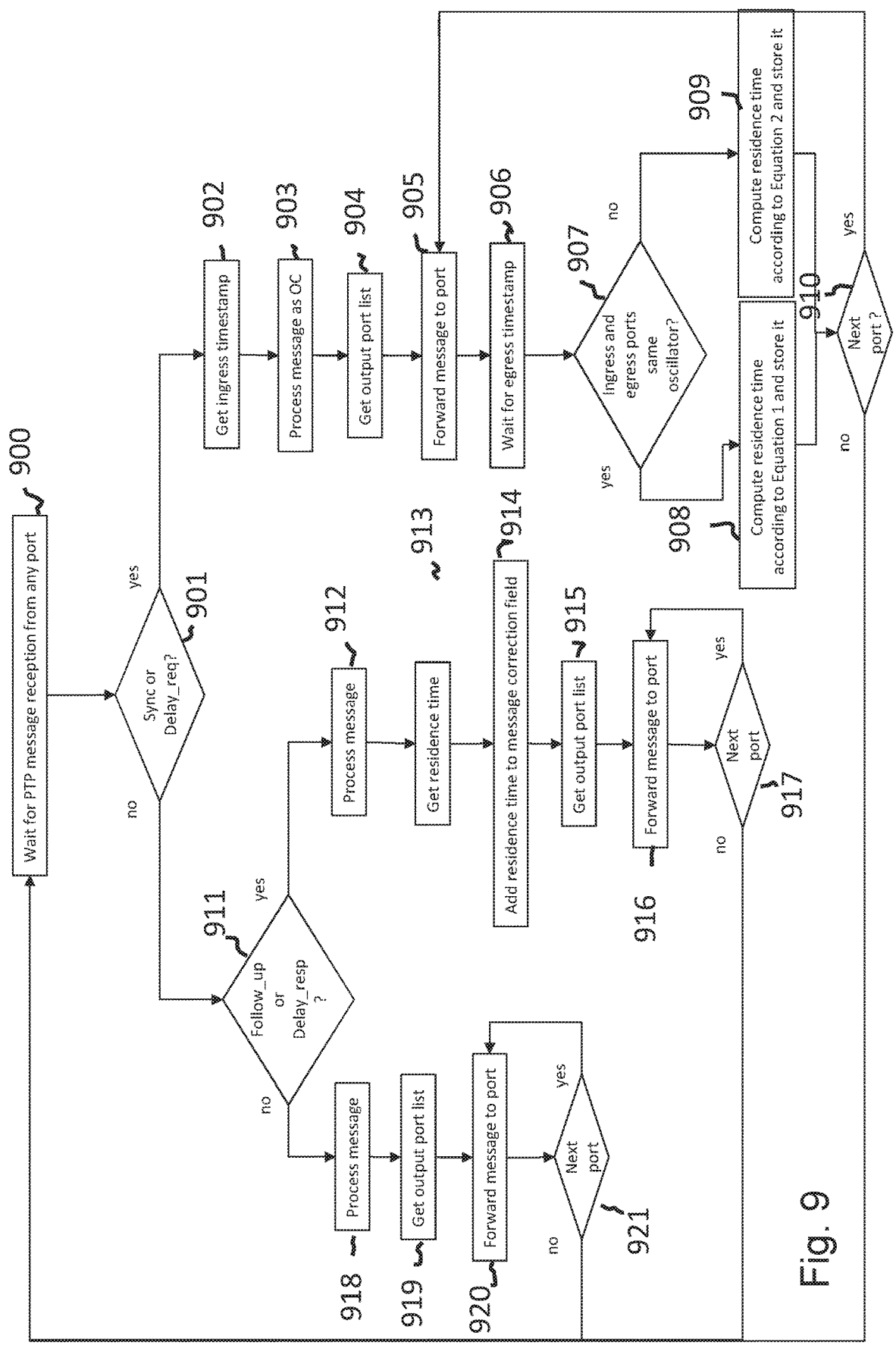
FIG. 9 illustrates steps of a processing of the PTP messages for residence time calculation according to embodiments.

FIG. 9 illustrates steps of processing the PTP messages for residence time calculation according to embodiments.

It is recalled that the residence time corresponds to the amount of time elapsed between the reception of a message and the forwarding of this message. The reception and forwarding instants are represented by the ingress timestamp and the egress timestamp.

According to embodiments where time systems share the same oscillator, the residence time is the difference between the egress timestamp $TS_{egress}$ and the ingress timestamp $TS_{ingress}$ plus the initial clock offset $clockOffset_{initial}$ between the time systems at start-up (at counter alignment time):

$$residenceTime = TS_{egress} - TS_{ingress} + clockOffset_{initial} \quad \text{(Equation 1)}$$

Usually, the time counter alignment procedure succeeds in fully aligning time counters and thus $clockOffset_{initial}$ is equal to zero. The initial clock offset is computed and stored at step 602-603 of FIG. 6 (software-only embodiment) or at step 704-705 of FIG. 7 (PPS-assisted embodiment) and can thus be retrieved from memory.

According to other embodiments where time systems are cadenced by independent oscillators, the residence time is the difference between the egress timestamp $TS_{egress}$ and the ingress timestamp $TS_{ingress}$ plus the clock offset between the time systems at the instant of the egress which is equal to the sum of the clock offset at discipline time $clockOffset_{discipline}$ plus the clock offset change between the discipline time and the egress time.

The clock change between the discipline time and the egress time is generally due to a least two factors: the clock adjustment applied at discipline time and the oscillators frequency variations in response to environment change. The clock adjustment can be made by offset adjustment, frequency adjustment or both.

In practice, the environmental oscillator frequency changes may be neglected in such short time (1 second worst case).

Hence, the clock offset change between the discipline time and the egress time can be approximated as the clock adjustment applied at discipline time $offsetAdjustment_{discipline}$.

The residence time may thus be computed as follows (Equation 2):

$$residenceTime = TS_{egree} - TS_{ingress} + clockOffset_{discipline} - offsetAdjustment_{discipline}$$

In practice, the clock offset is computed and stored at step 602-603 of FIG. 6 (software-only embodiment) or at step 704-705 of FIG. 7 (PPS-assisted embodiment) and can thus be retrieved from memory. The offset adjustment is computed and stored at step 604 of FIG. 6 (software-only embodiment) or at step 706 of FIG. 7 (PPS-assisted embodiment) and can thus be retrieved from memory.

In this example, at step 900, the reception of a PTP message is awaited from any of the Ethernet ports. When a PTP message is received, three different processing paths may be executed depending on the message type.

If the received message is a "Sync" message or "Delay_req" message (positive response to test 901), the ingress timestamp corresponding to the message reception is obtained at step 902.

Next, at step 903, the message is processed by the PTP process according to the PTP specifications for an Ordinary Clock. This processing may result in master time system clock adjustment as described with reference to FIG. 8.

At step 904, an output port list is generated. It mentions the Ethernet port that the message must be forwarded to. In practice, this list is obtained by applying the so-called 802.1 Ethernet bridging routing rules and the PTP BMCA topology constraints. The PTP BMCA prevents the forwarding of the PTP messages on certain Ethernet ports to prevent infinite message looping in the system.

At step 905, the PTP message is forwarded to a first port in the list of output ports.

At step 906, the egress timestamp is obtained at the time the message leaves.

Next, if the time systems of input and output ports share the same oscillator (positive response to test 907), the residence time is calculated according to Equation 1 and then stored in RAM together with the message sequence identifier at step 908.

Otherwise, if the time systems of input and output ports are cadenced by independent oscillators (negative response to test 907), the residence time is calculated according to Equation 2 and then stored in RAM together with the message sequence identifier at step 909.

Next, if there is another output port on the list (positive response to test 910), the process loops to step 905. Otherwise, it means that the message has been forwarded to all output ports (negative response to test 910) and the process loops back to initial step 900.

If the received message is not a "Sync" message or "Delay_req" message (negative response to test 901), but is a "Follow_up" message or a "Delay_resp" message (positive response to test 911), the message is processed by the PTP process according to the PTP specifications for an Ordinary Clock at step 912. This processing may result in master time system clock adjustment as described with reference to FIG. 8.

At step 913, the residence time of the corresponding Sync or Delay_req message is retrieved from the RAM.

At step 914, the correction field of the received PTP message is read and the obtained residence time is added to the value of the correction field.

At step 915, an output port list is generated. This step is similar to step 904.

At step 916, the PTP message is forwarded to a first port mentioned in the list of output ports. This step is similar to step 905. This step is repeated for all the output ports of the list (positive response to test 917).

When the message has been forwarded to all output ports (negative response to test 917) the process loops back to the initial step 900.

If the received message is not a "Sync" message or "Delay_req" message (negative response to test 901) and not a "Follow_up" message or a "Delay_resp" message (negative response to test 911), the message is processed by the PTP process according to the PTP specifications for an Ordinary Clock at step 518. This step is similar to step 512.

Next, at step 919, an output port list is generated. This step is similar to steps 904 and 915.

At step 920, the PTP message is forwarded to a first port mentioned in the list of output ports. This step is similar to step 905 and 916. This step is repeated for all the output ports of the list (positive response to test 921).

When the message has been forwarded to all output ports (negative response to test 921) the process loops back to the initial step 900.

While the invention has been illustrated and described in detail in the drawings and foregoing description, such illustration and description are to be considered illustrative or exemplary and not restrictive, the invention being not restricted to the disclosed embodiments. Other variations to the disclosed embodiments can be understood and effected by those skilled in the art in putting into practice (i.e. performing) the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A communication device comprising one communication port called reception port and another communication port called forward port, one of the communication ports being set as a master port, each communication port being associated with a respective clock, the communication device being further configured for:
   computing an offset between the respective clocks associated with the reception and forward ports; and
   synchronizing the respective clocks based on the computed offset;
   wherein the communication device is further configured for computing a residence time as the amount of time elapsed between reception of a message at the reception port and forward of this message at the forward port, the residence time being equal to:

$$TS_{egress} - TS_{ingress} + clockOffset_{initial}$$

when the respective clocks are cadenced by the same oscillator, and the residence time being equal to:

$$TS_{egress} - TS_{ingress} + clockOffset_{discipline} - offsetAdjustment_{discipline}$$

when the respective clocks are each cadenced by a respective independent oscillator,
   where:
   $TS_{ingress}$ is an ingress timestamp at reception time;
   $TS_{egress}$ is an egress timestamp at forward time; and
   $clockOffset_{initial}$ is the clock offset at start-up between the clocks associated with the reception port and the forward port;
   $clockOffset_{discipline}$ is the clock offset at a processing time between the clocks associated with the reception port and the forward port; and
   $offsetAdjustment_{discipline}$ is the clock adjustment applied to the clocks associated with the reception port and the forward port at the processing time,
   wherein the processing time is a time of a last application of a process applied between the master port and the other communication ports during runtime of the communication device for maintaining the synchronization of the clocks associated with the communication ports, the process taking into account the computed offset.

2. The communication device of claim 1, wherein the respective clocks are cadenced by the same oscillator and the communication device is further configured for performing the following steps from start-up and during runtime of the communication device:
   adjusting the clock associated with the master port with the Grand Master clock of a system comprising the communication device;
   applying a same adjustment to all the other clocks associated with the other communication ports.

3. The communication device of claim 1, wherein the respective clocks are each cadenced by a respective independent oscillator and wherein the communication device is further configured for applying a process between the master port and the other communication ports during runtime of the communication device for maintaining the synchronization of the clocks associated with the communication ports, the process taking into account the computed offset.

4. The communication device of claim 3, wherein the process comprises:
   computing a clock adjustment to apply to the respective clocks based on the computed offset;
   adjusting the respective clocks with the computed clock adjustment.

5. The communication device of claim 3, wherein the process comprises:
   upon PPS interrupt, computing a clock adjustment to apply to the respective clocks based on a timestamp associated with the PPS interrupt;
   adjusting the respective clocks with the computed clock adjustment.

6. The communication device of claim 3, wherein the communication device is further configured for launching a process running a PTP stack for synchronizing clock associated with the master port with the Grand Master clock of a system comprising the communication device.

7. A method for internal synchronization of a communication device comprising one communication port called reception port and another communication port called forward port, one of the communication ports being set as a master port, each communication port being associated with a respective clock, the method comprising the following steps:
   computing an offset existing between the respective clocks associated with the communication ports; and
   synchronizing the respective clocks based on the computed offset;
   wherein the method further comprises computing a residence time as the amount of time elapsed between reception of a message at the reception port and forward of this message at the forward port,
   the residence time being equal to:

$$TS_{egress} - TS_{ingress} + clockOffset_{initial}$$

when the respective clocks are cadenced by the same oscillator,
   and the residence time being equal to:

$$TS_{egress} - TS_{ingress} + clockOffset_{discipline} - offsetAdjustment_{discipline}$$

when the respective clocks are each cadenced by a respective independent oscillator;
   where:
   $TS_{ingress}$ is an ingress timestamp at reception time;
   $TS_{egress}$ is an egress timestamp at forward time; and
   $clockOffset_{initial}$ is the clock offset at start-up between the clocks associated with the reception port and the forward port;

clockOffset$_{discipline}$ is the clock offset at a processing time between the clocks associated with the reception port and the forward port; and offsetAdjustment$_{discipline}$ is the clock adjustment applied to the clocks associated with the reception port and the forward port at the processing time, wherein the processing time is a time of a last application of a process applied between the master port and the other communication ports during runtime of the communication device for maintaining the synchronization of the clocks associated with the communication ports, the process taking into account the computed offset.

8. The method of claim 7, wherein the respective clocks are cadenced by the same oscillator, the method comprising the following steps at start-up:
   adjusting the clock associated with the master port with the Grand Master clock of a system comprising the communication device;
   applying a same adjustment to all the other clocks associated with the other communication ports.

9. The method of claim 7, wherein the respective clocks are each cadenced by a respective independent oscillator, the method further comprising applying a process between the master port and the other communication ports during runtime of the communication device for maintaining the synchronization of the clocks associated with the communication ports, the process taking into account the computed offset.

10. The method of claim 9, wherein the process comprises:
    computing a clock adjustment to apply to the respective clocks based on the computed offset;
    adjusting the respective clocks with the computed clock adjustment.

11. The method of claim 9, wherein the process comprises:
    upon PPS interrupt, computing a clock adjustment to apply to the respective clocks based on a timestamp associated with the PPS interrupt;
    adjusting the respective clocks with the computed clock adjustment.

12. The method of claim 9, further comprising launching a process running a PTP stack for synchronizing clock associated with the master port with the Grand Master clock of a system comprising the communication device.

13. A cascaded network comprising at least two communication devices according to claim 1.

* * * * *